United States Patent Office.

GEORGE SANGER, OF BELOIT, WISCONSIN.

Letters Patent No. 92,656, dated July 13, 1869.

---

IMPROVED PROCESS FOR REFINING TALLOW.

---

The Schedule referred to in these Letters Patent and making part of the same.

---

*To all whom it may concern:*

Be it known that I, GEORGE SANGER, of Beloit, Rock county, in the State of Wisconsin, have invented certain new and useful Improvements in the Art or Process of Refining Tallow for Making Candles; and I do hereby declare the following description to be sufficient to enable any person skilled in the art or science to which it most nearly appertains to make and use my said invention, or improvement, without further invention or experiment.

The nature of my invention and improvements consists in the employment of the ingredients hereinafter named, by substantially the process hereinafter set forth, for the purpose of refining tallow for making candles, to wit:

Put into a steam melting-kettle one thousand pounds of the sweetest and purest of common tallow; add fifteen gallons of water; start steam, and bring to a boil. Then put into a pail one gallon of whale oil, and one ound of supercarbonate of soda. Mix it thoroughly together, and add it to the tallow in the kettle. Let it boil for one and a half hour. Then put into a pail one-quarter of a pound of alum and one ounce of verdigris, well pulverized. Then take about two gallons of hot tallow from the kettle, and put into same pail, and stir till well mixed, and pour it into the kettle. Then put into same pail two quarts of fine salt; add two gallons of water; stir till thoroughly dissolved. Then pour it into the kettle; boil for one hour; let stand for ten hours; and then dip it off. It is then ready to be made into candles.

What I claim as my invention and improvements, and desire to secure by Letters Patent, is—

The herein-described process of refining tallow, substantially as and for the purpose specified.

GEORGE SANGER.

Witnesses:
   H. P. JOHNSON,
   R. F. DUTTON.